(12) United States Patent
Chen et al.

(10) Patent No.: US 7,814,036 B2
(45) Date of Patent: Oct. 12, 2010

(54) PROCESSING WELL LOGGING DATA WITH NEURAL NETWORK

(75) Inventors: Dingding Chen, Plano, TX (US); Luis E. San Martin, Houston, TX (US); Gulamabbas A. Merchant, Houston, TX (US); Robert W. Strickland, Austin, TX (US); Martin T. Hagan, Stillwater, OK (US)

(73) Assignee: Haliburton Energy Services, Inc., Houston, TX (US)

( * ) Notice: Subject to any disclaimer, the term of this patent is extended or adjusted under 35 U.S.C. 154(b) by 607 days.

(21) Appl. No.: 10/600,991

(22) Filed: Jun. 19, 2003

(65) Prior Publication Data

US 2004/0257240 A1 Dec. 23, 2004

(51) Int. Cl.
| | |
|---|---|
| G06E 1/00 | (2006.01) |
| G06E 3/00 | (2006.01) |
| G06F 15/18 | (2006.01) |
| G06G 7/00 | (2006.01) |
| G06G 7/48 | (2006.01) |
| G01V 1/00 | (2006.01) |
| G01V 1/40 | (2006.01) |
| G01V 3/18 | (2006.01) |
| G01V 5/04 | (2006.01) |
| G01V 9/00 | (2006.01) |
| E21B 47/14 | (2006.01) |
| G01V 3/00 | (2006.01) |
| G01V 5/00 | (2006.01) |

(52) U.S. Cl. .............................. 706/22; 706/929; 702/6; 702/7; 367/81; 367/86; 703/10; 324/351; 324/366; 250/253

(58) Field of Classification Search ......... 706/928–929, 706/22; 702/6–7, 9–11; 367/81–83, 86, 367/69; 703/10; 507/100; 166/254.2; 250/253–256; 324/351–352, 366
See application file for complete search history.

(56) References Cited

U.S. PATENT DOCUMENTS

| 2,836,356 | A | * | 5/1958 | Forrest et al. ................ 341/164 |
|---|---|---|---|---|
| 3,311,875 | A | * | 3/1967 | Geyer et al. .................... 367/41 |
| 3,509,458 | A | * | 4/1970 | Girard ........................... 324/97 |
| 3,784,828 | A | * | 1/1974 | Hayes ......................... 250/260 |
| 3,954,006 | A | * | 5/1976 | Anderson et al. ......... 73/152.34 |

(Continued)

OTHER PUBLICATIONS

PCT International Search Report, Dec. 10, 2002.

*Primary Examiner*—Michael B. Holmes
*Assistant Examiner*—Benjamin Buss
(74) *Attorney, Agent, or Firm*—Conley Rose, P.C.

(57) ABSTRACT

An artificial neural network, ANN, and method of training the ANN for inversion of logging tool signals into well logs of formation parameters is disclosed. Properly selected synthetic models of earth formations are used to train the ANN. The models include Oklahoma and chirp type of formations. In each model parameter contrasts of from 10 to 1 to about 100 to 1 are included. Models including maximum and minimum parameter values spanning the operating range of the selected logging tool are included. Parameter contrasts at interfaces are limited to realistic values found in earth formations. The selected models are used to generate synthetic tool signals, which are then used as inputs to the ANN for training. When the ANN coefficients are properly adjusted to produce an output matching the original models, the ANN can be used for inversion of any real signals from the selected logging tool.

17 Claims, 14 Drawing Sheets

U.S. PATENT DOCUMENTS

| | | | | |
|---|---|---|---|---|
| 4,852,067 A * | 7/1989 | White | ............................ | 367/31 |
| 4,937,747 A * | 6/1990 | Koller | ............................ | 702/12 |
| 5,008,845 A * | 4/1991 | Adcock | ...................... | 340/384.7 |
| 5,019,978 A * | 5/1991 | Howard et al. | .................. | 702/6 |
| 5,184,079 A * | 2/1993 | Barber | ............................ | 702/7 |
| 5,210,691 A * | 5/1993 | Freedman et al. | ............... | 702/7 |
| 5,251,286 A * | 10/1993 | Wiener et al. | .................. | 706/20 |
| 5,300,770 A | 4/1994 | Allen et al. | .................. | 250/269 |
| 5,345,077 A | 9/1994 | Allen et al. | .................. | 250/264 |
| 5,444,619 A | 8/1995 | Hoskins et al. | ............. | 364/421 |
| 5,536,938 A * | 7/1996 | Mills et al. | ................... | 706/929 |
| 5,684,693 A * | 11/1997 | Li | ................................. | 702/6 |
| 5,821,413 A * | 10/1998 | Chapin | ..................... | 73/152.05 |
| 5,828,981 A | 10/1998 | Callender et al. | ............... | 702/6 |
| 5,862,513 A * | 1/1999 | Mezzatesta et al. | ............ | 702/9 |
| 5,867,806 A * | 2/1999 | Strickland et al. | ............... | 702/7 |
| 5,883,515 A | 3/1999 | Strack et al. | ................. | 324/339 |
| 5,940,777 A * | 8/1999 | Keskes | ......................... | 702/16 |
| 6,044,325 A | 3/2000 | Chakravarthy et al. | .......... | 702/7 |
| 6,216,089 B1 * | 4/2001 | Minerbo | ......................... | 702/7 |
| 6,219,619 B1 | 4/2001 | Xiao et al. | ...................... | 702/7 |
| 6,289,285 B1 * | 9/2001 | Neff et al. | ...................... | 702/16 |
| 6,304,086 B1 * | 10/2001 | Minerbo et al. | ................. | 702/7 |
| 6,374,185 B1 * | 4/2002 | Taner et al. | ................... | 702/6 |
| 6,381,542 B1 * | 4/2002 | Zhang et al. | ................... | 702/7 |
| 6,606,565 B1 * | 8/2003 | Strickland et al. | ............... | 702/7 |

* cited by examiner

Output node 1: $R_{t1}(1)$ $R_{t1}(2)$ $R_{t1}(3)$ $R_{t1}(4)$ $R_{t1}(5)$ $R_{t1}(6)$ $R_{t1}(7)$ ...

Output node 2: $R_{t2}(2)$ $R_{t2}(3)$ $R_{t2}(4)$ $R_{t2}(5)$ $R_{t2}(6)$ $R_{t2}(7)$ $R_{t2}(8)$ ...

Output node 3: $R_{t3}(3)$ $R_{t3}(4)$ $R_{t3}(5)$ $R_{t3}(6)$ $R_{t3}(7)$ $R_{t3}(8)$ $R_{t3}(9)$ ...

Output node 4: $R_{t4}(4)$ $R_{t4}(5)$ $R_{t4}(6)$ $R_{t4}(7)$ $R_{t4}(8)$ $R_{t4}(9)$ $R_{t4}(10)$ ...

Output node 5: $R_{t5}(5)$ $R_{t5}(6)$ $R_{t5}(7)$ $R_{t5}(8)$ $R_{t5}(9)$ $R_{t5}(10)$ $R_{t5}(11)$ ...

Figure 13

PROCESSING WELL LOGGING DATA WITH NEURAL NETWORK

PRIORITY

This application is a continuation of PCT Application Ser. No. PCT/US01/49193, filed Dec. 19, 2001, entitled "Processing Well Logging Data With Neural Network" which claims priority from U.S. Provisional 60/256,679; filed Dec. 19, 2000 and U.S. Provisional 60/299,002; filed Jun. 18, 2001.

FIELD OF THE INVENTION

This invention relates to well logging, and more particularly to a neural network trained for processing signals from a logging tool into a representation of formation parameters.

BACKGROUND OF THE INVENTION

Modern petroleum drilling and production operations demand a great quantity of information relating to parameters and conditions downhole. Such information typically includes characteristics of the earth formations traversed by the wellbore, in addition to data relating to the size and configuration of the borehole itself. Oil well logging has been known in the industry for many years as a technique for providing information to a formation evaluation professional or driller regarding the particular earth formation being drilled. The collection of information relating to conditions downhole, which commonly is referred to as "logging," can be performed by several methods. These methods include measurement while drilling, MWD, and logging while drilling, LWD, in which a logging tool is carried on a drill string during the drilling process. The methods also include wireline logging.

In conventional oil well wireline logging, a probe or "sonde" is lowered into the borehole after some or all of the well has been drilled, and is used to determine certain characteristics of the formations traversed by the borehole. The sonde may include one or more sensors to measure parameters downhole and typically is constructed as a hermetically sealed cylinder for housing the sensors, which hangs at the end of a long cable or "wireline." The cable or wireline provides mechanical support to the sonde and also provides electrical connections between the sensors and associated instrumentation within the sonde, and electrical equipment located at the surface of the well. Normally, the cable supplies operating power to the sonde and is used as an electrical conductor to transmit information signals from the sonde to the surface. In accordance with conventional techniques, various parameters of the earth's formations are measured and correlated with the position of the sonde in the borehole as the sonde is pulled uphole.

A chart or plot of an earth parameter or of a logging tool signal versus the position or depth in the borehole is called a "log." The depth may be the distance from the surface of the earth to the location of the tool in the borehole or may be true depth, which is the same only for a perfectly vertical straight borehole. The log of the tool signal or raw data often does not provide a clear representation of the earth parameter which the formation evaluation professional or driller needs to know. The tool signal must usually be processed to produce a log which more clearly represents a desired parameter. The log is normally first created in digital form by a computer and stored in computer memory, on tape, disk, etc. and may be displayed on a computer screen or printed in hard copy form.

The sensors used in a wireline sonde usually include a source device for transmitting energy into the formation, and one or more receivers for detecting the energy reflected from the formation. Various sensors have been used to determine particular characteristics of the formation, including nuclear sensors, acoustic sensors, and electrical sensors. See generally J. Lab, *A Practical Introduction to Borehole Geophysics* (Society of Exploration Geophysicists 1986); D. R. Skinner, *Introduction to Petroleum Production*, Volume 1, at 54-63 (Gulf Publishing Co. 1981).

For a formation to contain petroleum, and for the formation to permit the petroleum to flow through it, the rock comprising the formation must have certain well-known physical characteristics. One characteristic is that the formation has a certain range of measurable resistivity (or conductivity), which in many cases can be determined by inducing an alternating electromagnetic field into the formation by a transmitter coil arrangement. The electromagnetic field induces alternating electric (or eddy) currents in the formation in paths that are substantially coaxial with the transmitter. These currents in turn create a secondary electromagnetic field in the medium, inducing an alternating voltage at the receiver coil. If the current in the transmitter coil is kept constant, the eddy current intensity is generally proportional to the conductivity of the formation. Consequently, the conductivity of the formation determines the intensity of the secondary electromagnetic field, and thus, the amplitude of the voltage at the receiver coil. See generally, James R. Jordan, et al., *Well Logging II—Electric And Acoustic Logging*, SPE Monograph Series, Volume 10, at 71-87 (1986).

An exemplary induction tool is shown in the prior art drawing of FIG. 1, in which one or more transmitters (T) and a plurality of receivers ($R_i$) are shown in a logging sonde. Each transmitter or receiver may be a set of coils, with modern array induction tools having several receivers, e.g. $R_1$, $R_2$, $R_3$, and $R_4$, of increasing transmitter-to-receiver spacing to measure progressively deeper into the formation.

In a conventional induction tool such as that shown in FIG. 1, the coils are wound coaxially around a cylindrical mandrel. Both transmitter coils and receiver coils are solenoidal, and are wound coaxial with the mandrel. Such coils would therefore be aligned with the principal axis of the logging tool, which is normally also the central axis of the borehole and is usually referred to as the z-axis. That is, the magnetic moments of the coils are aligned with the axis of the mandrel on which they are wound. The number, position, and numbers of turns of the coils are arranged to null the signal in a vacuum due to the mutual inductance of transmitters and receivers.

During operation, an oscillator supplies alternating current to the transmitter coil or coils, thereby inducing current in the receiver coil or coils. The voltage of the current induced in the receiver coils results from the sum of all eddy currents induced in the surrounding formations by the transmitter coils. Phase sensitive electronics measure the receiver voltage that is in-phase with the transmitter current divided by magnitude of the transmitter current. When normalized with the proper scale factor, this provides signals representing the apparent conductivity of that part of the formation through which the transmitted signal passed. The out-of-phase, or quadrature, component can also be useful because of its sensitivity to skin effect although it is less stable and is adversely affected by contrasts in the magnetic permeability.

As noted, the induced eddy currents tend to flow in circular paths that are coaxial with the transmitter coil. As shown in FIG. 1, for a vertical borehole traversing horizontal formations, there is a general symmetry for the induced current around the logging tool. In this ideal situation, each line of current flow remains in the same formation along its entire flow path, and never crosses a bed boundary.

In many situations, as shown for example in FIG. 2, the wellbore is not vertical and the bed boundaries are not horizontal. The well bore in FIG. 2 is shown with an inclination angle θ measured relative to true vertical. A bed boundary between formations is shown with a dip angle α. The inclined wellbore strikes the dipping bed at an angle β. As a result, the induced eddy currents flow through more than one media, encountering formations with different resistive properties. The resulting logs are distorted, especially as the dip angle α of the bed boundaries increases. If the logging tool traverses a thin bed, the problem becomes even more exaggerated.

As shown in the graph of FIG. 3A, an induction sonde traversing a dipping bed produces a log with distortions normally referred to as "horns". The more severe the dip angle, the less accurate is the measurement with depth. FIG. 3A represents a computer simulation of a log that would be generated during logging of a ten-foot thick bed (in actual depth), with different plots for different dip angles. FIG. 3B shows a computer simulation of a log which would be generated if the thickness of the bed were true vertical depth, with different plots for different dip angles. As is evident from these simulated logs, as the dip angle increases, the accuracy and meaningfulness of the log decreases. In instances of high dip angles, the plots become virtually meaningless in the vicinity of the bed boundaries.

FIGS. 3A and 3B also illustrate that even for a vertical well traversing horizontal formations, the actual electrical signal or data produced by an induction logging tool is quite different from an exact plot of formation resistivities. In these figures the desired representations of formation resistivity are the dashed line square wave shapes 10 and 20. The actual resistivity within a layer is generally uniform so that there are abrupt changes in resistivity at the interfaces between layers. However, logging tools have limited resolution and do not directly measure these abrupt changes. When the transmitter coil T in FIG. 1 is near an interface, as illustrated, its transmitted signal is split between layers of differing resistivity. As a result, the raw data or signal from the logging tool is a composite or average of the actual values of the adjacent layers. This effect is referred to as the shoulder effect. Even in the 0° case shown in the FIGS. 3A and 3B, where the tool is vertical and the formation is horizontal, the measured data is quite different from the desired representation of resistivity. As the dip increases, the effect is increased.

Much work has been done on methods and equipment for processing logging tool data or signals to produce an accurate representation of formation parameters. This data processing process is commonly called inversion. Inversion is usually carried out in some type of computer. In the prior art system of FIG. 1, a block labeled "computing module" may perform some type of inversion process. The methods currently available to perform this processing are iterative in nature. The standard iterative methods have the disadvantage of being computationally intensive. As a result, the inversion must normally be carried out at computing centers using relatively large computers, which can deliver results of the inversion in a reasonable amount of time, and normally cannot be performed in computers suitable for use at the well site.

An alternative processing method is the deconvolution method. This method is very fast and can be implemented at the well site, for example in the computing module of FIG. 1. However, this method is based on linear filter theory, which is an approximation that is not always accurate. In deviated boreholes, the nonlinearity of the tool response becomes manifest, making the problem hard for the deconvolution method to handle. The deconvolution methods do not generate actual representations of the formation parameters, so they cannot be properly called inversion methods.

Early attempts to solve the inversion of log data problem used the parametric inversion method. This method is an iterative method that uses a forward solver and criteria, such as the least square inversion, to determine the best fit for the parameters of a predefined formation, usually a model with a step profile. However, if the actual formation does not conform to the predefined model, the output parameters determined by this method can be very far from the actual parameters of the formation. This is a consequence of the ill posed nature of the inversion problem which makes it highly nontrivial.

A more current method for inversion of resistivity log data is the Maximum Entropy Method, MEM. In this iterative method, a test or proposed formation model is modified to maximize the entropy functional, which depends on the parameters of the formation. This method does not use a predefined formation and produces solutions of better quality. It is more efficient than the parametric approaches, but is still computationally intensive. It can be applied to any type of tool for which a forward solver is available. An example of the MEM method is disclosed in U.S. Pat. No. 5,210,691 entitled "Method and Apparatus for Producing a More Accurate Resistivity Log from Data Recorded by an Induction Sonde in a Borehole."

In general, all of the iterative inversion schemes have essentially two parts. The first part is a forward solver that generates a synthetic log from a synthetic test formation which is a reasonable representation of a real formation. The test formation is an assumed generally square wave plot of a formation parameter, e.g. resistivity, versus depth, like the plots 10 and 20 in FIGS. 3A and 3B. The forward solver simulates the response of a selected logging tool to the test formation to generate the synthetic log. If the logging tool has multiple transmitter receiver sets or arrays, as illustrated in FIG. 1, a separate forward solution is needed for each set, since each set responds differently. The second part of the iterative method is a criterion to modify the test formation. The criterion is based on the difference between the synthetic log corresponding to the test formation and the real log data measured by the tool. After the test formation has been modified, a new synthetic log is generated by the forward solver. This process is repeated iteratively until the difference between the synthetic log and the real log is less than a predefined tolerance. The output of the inversion algorithm is the parameters of the final test formation. These parameters are plotted versus depth to produce the desired log. It is the iterative nature of these methods which makes them computationally intensive.

Various efforts have been made to use Artificial Neural Networks, ANN, as part of inversion processes. For example, in the paper entitled "Detection of Layer Boundaries from Array Induction Tool Responses using Neural Networks", 69th Annual SEG international meeting (Houston, 1999). Expanded abstract, V1, pp 140-143, the authors Srinivasa V. Chakravarthy, Raghu K. Chunduru, Alberto G. Mezzatesta, and Otto Fanini use a trained radial basis function neural network to identify bed boundaries from induction well logs. The network is trained using the logarithmic derivative of both measured and synthetic log data. As a result, actual log data to be processed by the trained neural network must also be first processed by taking the logarithmic derivative. The detected bed boundaries are then used in known inversion processes.

In the publication entitled "*Artificial Neural Networks And High Speed Resistivity Modeling Software Speeds Reservoir Characterization*", Jeff S. Arbogast and Mark H. Franklin, Petroleum Engineer International, pp. 57-61, the authors describe use of a neural network trained on real well logs of various types. By proper selection of available logs for training, it is reported that it is possible to synthesize missing logs or fill in bad data for other wells in the same field.

In U.S. Pat. No. 5,251,286, Method for Estimating Formation Permeability from Wireline Logs Using Neural Networks, the inventors Jacky M. Wiener, Robert F. Moll and John A. Rogers disclose use of a neural network to determine permeability. The network is trained with resistivity, neutron porosity, bulk density, interval transit time, and other logs and actual measured core permeability. It is then able to use the same wireline log measurements from other wells in the same area to estimate formation permeability in wells from which cores were not actually taken and measured.

In U.S. Pat. No. 5,862,513, Systems and Methods for Forward Modeling of Well Logging Tool Responses, the inventors Alberto G. Mezzatesta, Michael A. Jervis, David R. Beard, Kurt M. Strack, and Leonty A. Tabarovsky disclose use of a neural network to produce synthetic tool responses for a well logging tool. The neural network is trained to simulate the response of a particular logging tool to models of earth formations. The trained network is intended for use as the forward solver in an iterative inversion process.

In U.S. Pat. No. 6,044,325, Conductivity Anisotropy Estimation Method for Inversion Processing of Measurements Made by a Transverse Electromagnetic Induction Logging Instrument, the inventors Srinivasa V. Chakravarthy, Pravin Gupta, Raghu Chunduru, Berthold G. Kriegshauser, and Otto N. Fanini teach a method of using a trained neural network for improving initial estimates of formation parameters. The network is trained by first synthesizing the response of the tool to models of earth formations. Then initial estimates of the earth parameters are calculated from the synthesized responses. The initial estimates and known earth models are used to train a neural network. To use the trained network with real data, actual tool signals are first processed to produce an initial estimate of earth parameters. These processed signals are then input to the trained neural network to produce improved estimates of parameters.

While these references have shown improvements in well log inversion by use of trained neural networks, none of them have taught a method for direct inversion of logging tool signals to produce a log of formation parameters. Direct inversion would be faster than the prior art methods and would allow real time generation of well logs at the well site. It would also allow real time processing of logging tool signals in LWD or MWD. This would be quite useful to the drilling engineer during the drilling process. For example, in slant well drilling the well logs could be used in guiding the drilling system.

SUMMARY OF THE INVENTION

The present invention provides an improved method for training a neural network to process logging signals to produce logs representative of an earth formation parameter and an improved trained neural network. Synthetic or artificial models of earth formation parameters are generated for training a neural network. The models are selected to cover the entire operating range of a selected tool based on its sensitivity and resolution characteristics and based on a realistic range of formation parameters. In each model, the parameter contrasts at layer interfaces are limited to realistic values which are within the operating range of the tool. The selected models include models which have minimum parameter values at the lower limit of the tool operating range and models which have maximum parameter values at the upper limit of the tool operating range. A forward solver is used to simulate the tool response to the models. The simulated responses and models are then used to train a neural network to produce the models as outputs in response to the simulated responses as inputs. Actual data collected by the logging tool may then be processed by the neural network to produce logs of the earth parameter.

BRIEF DESCRIPTION OF THE DRAWINGS

For a more detailed understanding of the invention, reference is now made to the drawings, wherein;

FIG. 13 is an illustration of averaging outputs of a constrained network committee over a diagonal;

DETAILED DESCRIPTION OF THE INVENTION

As can be seen from the references cited above, attempts to use artificial neural networks, ANNs, in the various inversion processes for well logging data have had limited success. Using large amounts of existing data to train neural networks increases the cost and expense of generating the trained ANN and has not improved the speed or accuracy or the ANN or made it widely applicable outside the area from which data was selected. Some developers have suggested that it is important to choose only those parts of the available data which are clearly accurate and not contaminated by bad borehole conditions, poor tool response, or other sources of error. If an ANN is taught to invert bad data into a good log, it is likely to invert good data into a bad log.

The present inventors have found that a viable way to avoid using bad or inaccurate data to train an ANN is to use only synthetic data. In addition, selection of training data should be based on the behavior of the selected tool, not the earth formations in any particular area. The training set should cover the operating range of the tool, but interface contrasts should be limited to realistic parameter ranges. By using these simple rules to select only a few earth formation models and to scale the models, trained ANNs were generated which provided good inversion of log data without geographical area limitation.

The above-cited references also illustrate that the structure of ANNs and methods for training ANNs are well known. The above referenced U.S. Pat. Nos. 5,251,286 and 5,862,513 are hereby incorporated by reference for all purposes and particularly for their disclosures concerning structure and training of ANNs.

Figure 4:
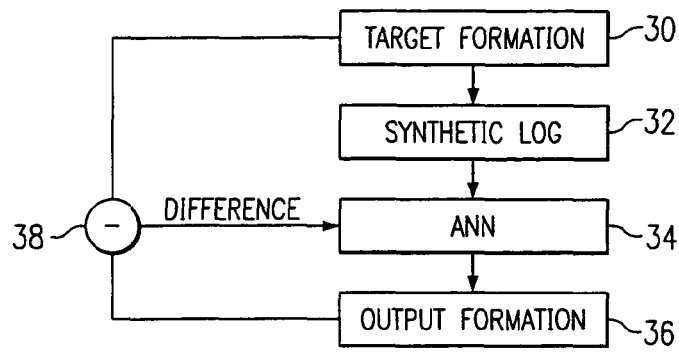
FIG. 4 is a flow chart illustrating training of a neural network.

With reference to FIG. 4, the training of an ANN according to the present invention will be described. A first step, represented by box 30, is to produce a number of synthetic formation models or target formations for the training process. Formations which were selected for a preferred embodiment will be described below with reference to FIGS. 5 and 6. All of the selected formation models are input to a forward solver to generate a synthetic log of conductivity at box 32. The forward solver is a computer program which simulates the response of a selected logging tool to any selected earth formation model. Modern induction tools have a number of transmitter to receiver spacings and a separate ANN can be trained for each or any combination of them. A separate forward solver is used for each transmitter to receiver spacing. In developing the present invention, the inventors based their work on the HRAI induction-logging tool developed by the assignee of this patent application. That tool is the subject of a paper entitled "*A New High Resolution Array Induction Tool*" by Randy Beste, T. Hagiwara, George King, Robert Strickland, and G. A. Merchant presented at the SPWLA 41$^{st}$ Annual Logging Symposium, Jun. 4-7, 2000.

The logarithm of the synthetic conductivity log generated in step 32 is fed to the input of the ANN 34 in the form of small windows of data. The input window is selected to include a number of samples corresponding at least to the range of borehole depths which a selected tool transmitter receiver set would be measuring at one time in a high resistivity zone. The window should include several samples corresponding to a range of several times the transmitter to receiver distance. Making the window wider generally improves the inversion scheme, but also increases the training time and cost.

In the preferred embodiment, the ANN was a multilayer feedforward perceptron neural network with fifty-one inputs. The input window included fifty-one samples representing tool signals spaced one half foot apart. These samples therefore represented data from twenty-five feet of borehole. In this embodiment the network had two hidden layers with eight neurons in the first and twenty in the second and had one output. Good results were also achieved with networks having three hidden layers. For each window of input data, the ANN 34 generated one output value centered on the input window. The process continued by inputting rolling windows of fifty-one samples. That is, one sample was dropped from one end of the window and one was added to the other end. At the end of the process, one output value was generated for each one-half foot spacing in the borehole.

In another trial, a window size of 101 samples was used, with the ANN again producing one output value centered on the input window. In this trial, the input sample spacing was one-quarter foot, so the inputs also represented fifty feet of borehole. The rolling input window process was again used to generate one output value for each one-quarter foot of borehole. However, this requires an ANN with 101 inputs and increases the training time and expense. The results achieved were not sufficiently different to justify the extra cost.

Various commercially available software can be used for building, training and testing neural networks. For example, the Neural Network Toolbox for MATLAB was used in development and testing of the present invention.

As the logarithm of the synthetic log data is input to ANN 34, it produces a representation of the earth formation models at its output 36. Since the input data was the logarithm of the synthetic tool conductivity signals, the output is the logarithm of a representation of the formation conductivity. The exponential of the outputs of the ANN are therefore used as the representation of the formation. Both the representation from output 36 and the input models from 30 are fed to a comparison step 38 which determines the difference between the two. The difference is fed back to the ANN 34 to adjust the parameters or coefficients of the ANN and the process is repeated. When the difference detected in comparison step 38 is below an acceptable error level, the process is stopped. When the ANN has thus been trained with all of the selected formation models, the final coefficients of the ANN are stored for future use. The ANN with these coefficients is then ready for use in processing of real data produced by the selected logging tool.

Figure 1:
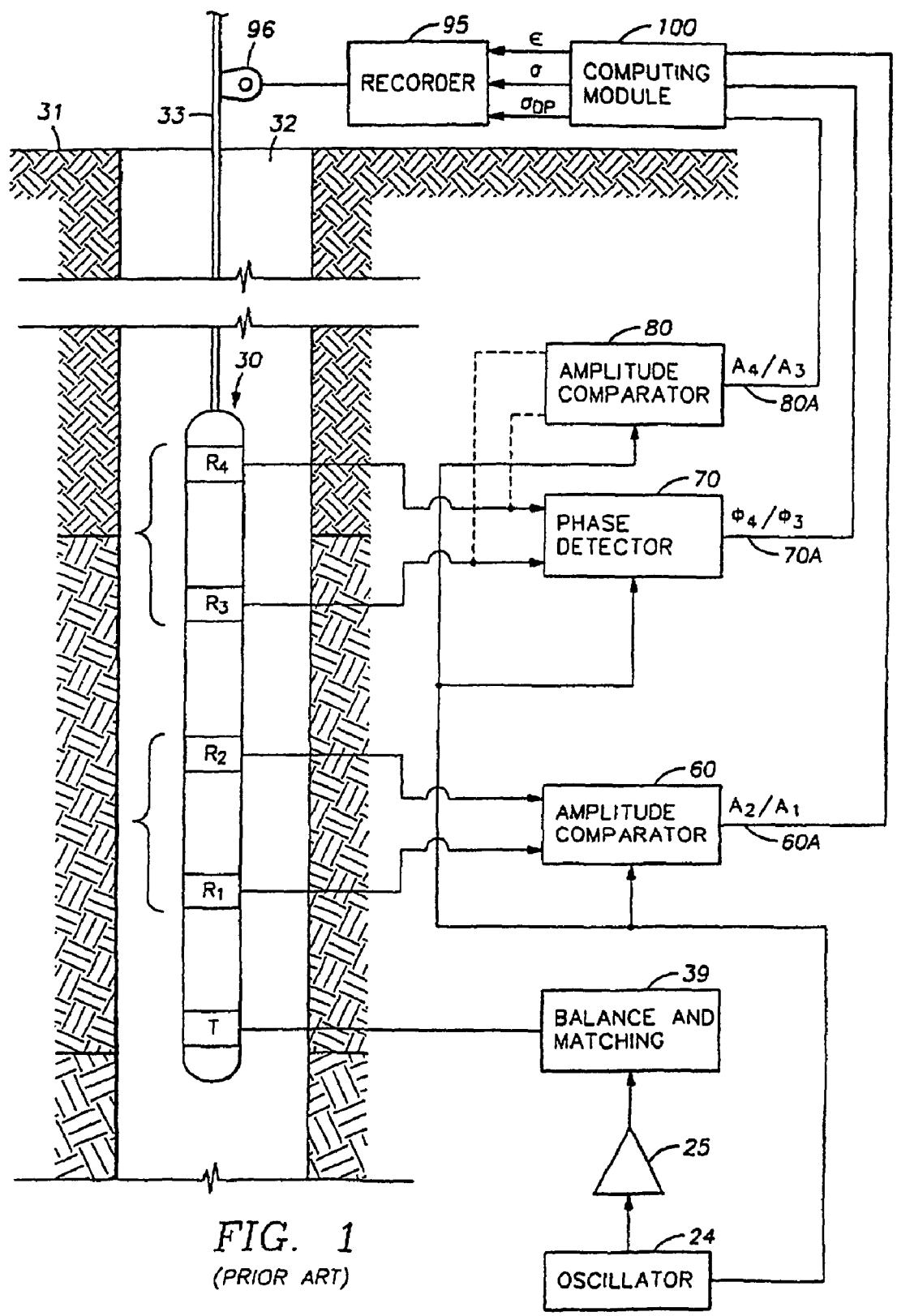
FIG. 1 is an illustration of a prior art induction logging system.
Figure 2:
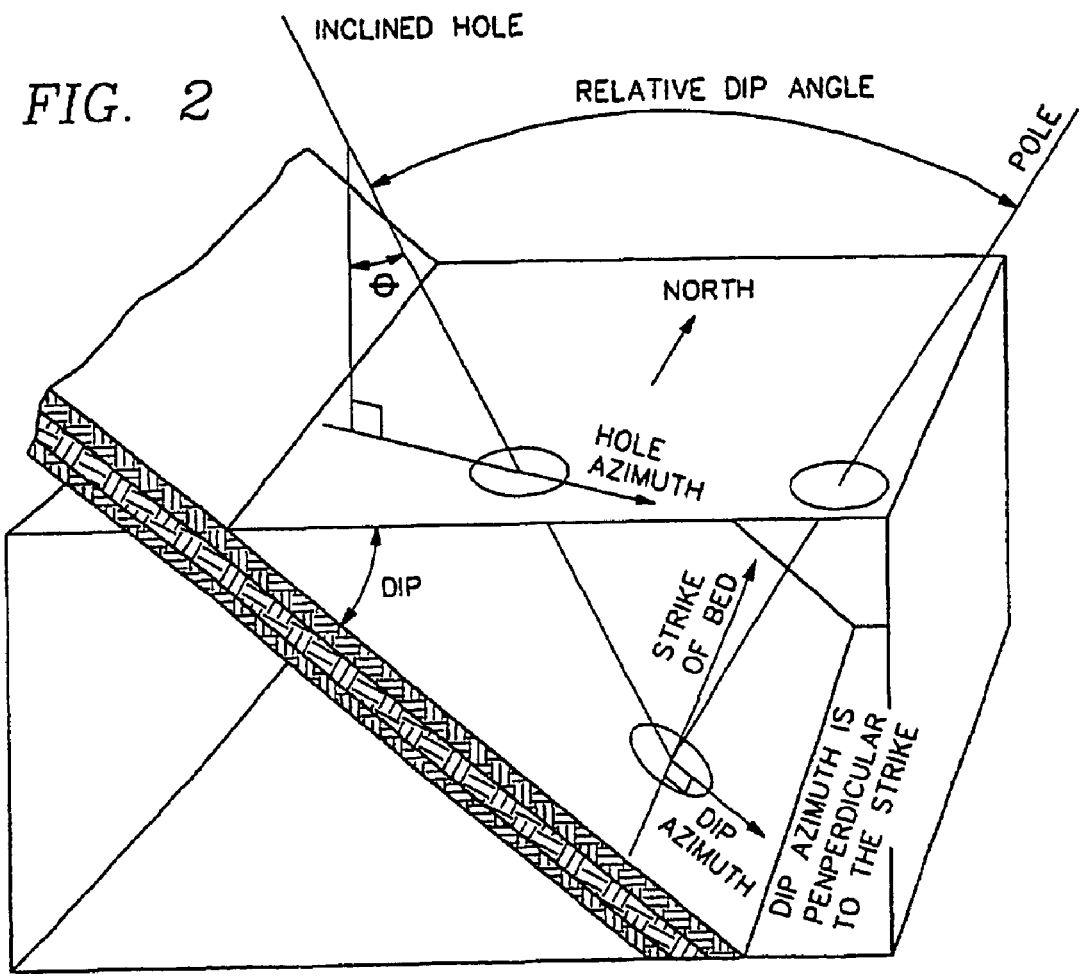
FIG. 2 is an illustration of a wellbore being drilled through a dipping bed formation in accordance with typical drilling practices.
Figure 3A:
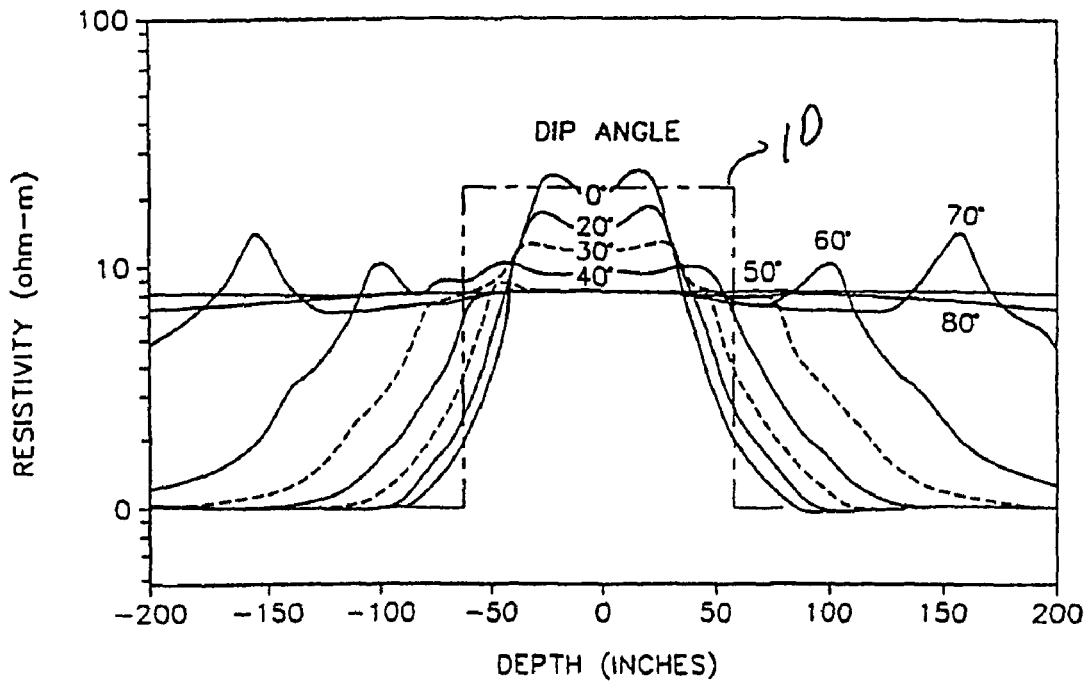
FIGS. 3A-3B depict resistivity data obtained in dipping bed formations using the induction sonde of FIG. 1.
Figure 3B:
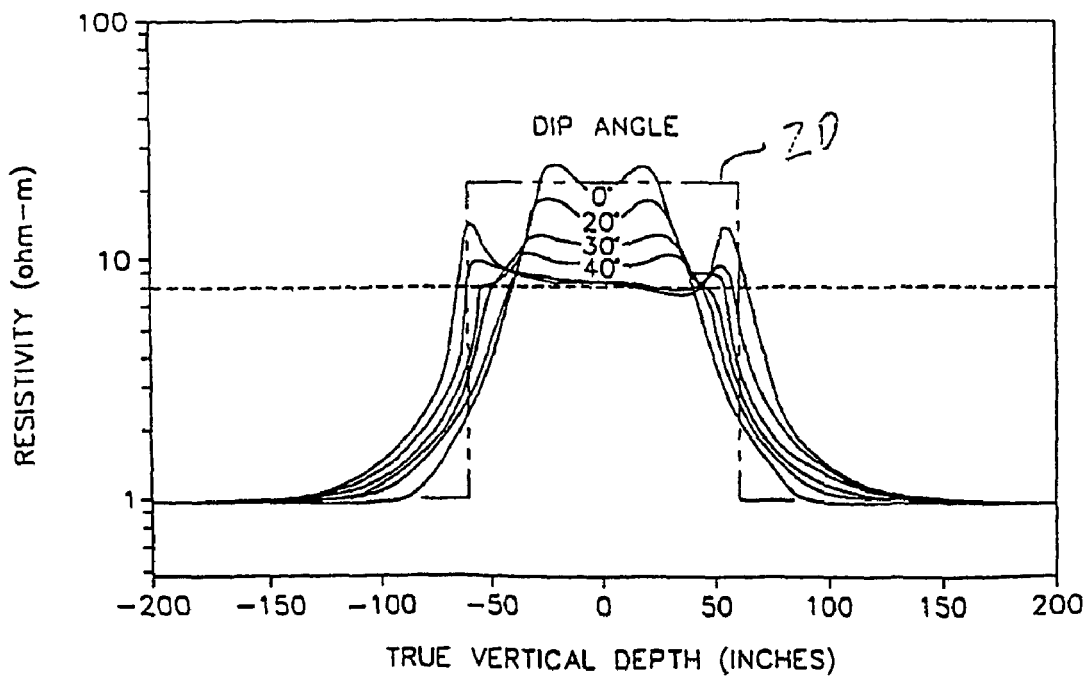

The process can be repeated for any selected dip angle. The same selected formation models are used in step 30. The forward solver is adjusted to simulate the selected dip angle so that the synthetic log produced at 32 accurately simulates tool response at the selected dip angle. As shown in FIGS. 3A and 3B, the tool response to the same earth formation can change significantly as the dip angle changes. When the ANN is trained with this data, it can be used to process real data from wells having the selected dip angle. In practice, a separate ANN need not be trained for every degree of possible dip. Instead, an ANN can be trained for every five to ten degrees of dip. When real data is to be processed, the one ANN with the closest dip can be selected and used. If the dip of the real data is, for example, half way between two of the dip angles selected for training ANNs, both can be used for processing the real data and the result can be extrapolated from the two outputs.

Figure 5:
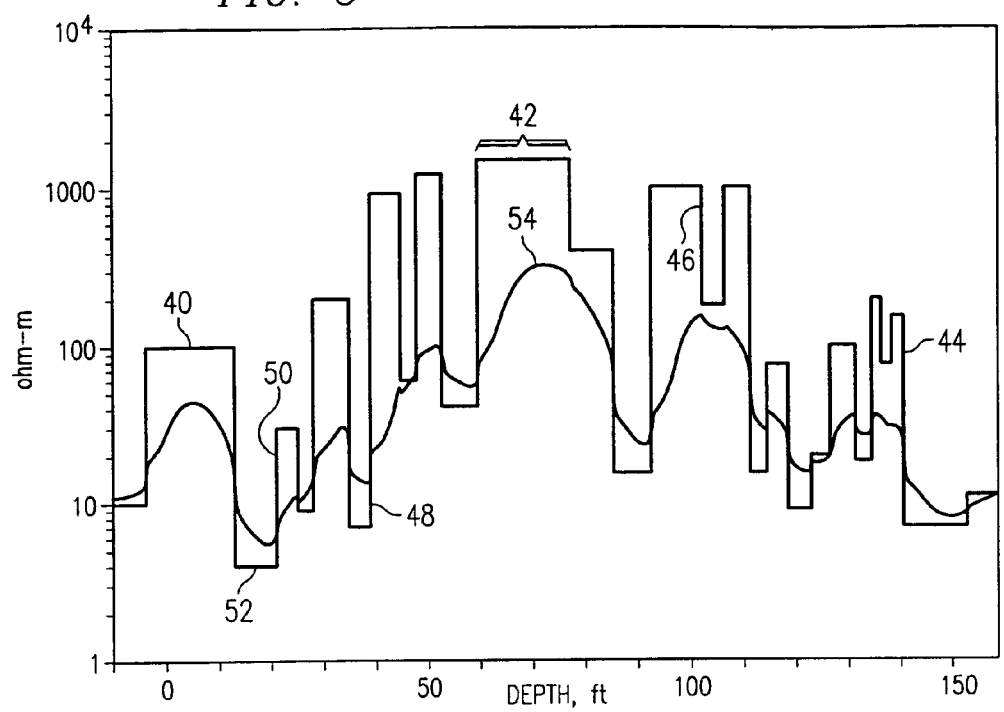
FIG. 5 is a plot of formation resistivity versus depth for Oklahoma-type earth formations.

With reference now to FIG. 5, there is shown one of the two basic earth models used in the preferred embodiment. This formation model is referred to as an Oklahoma type formation because it is similar to real earth formations which occur in Oklahoma. The particular one shown in FIG. 5 is however only a synthetic model selected to have certain characteristics. The formation is represented by the square wave plot 40 of resistivity versus depth. Since each earth-bedding layer normally has generally uniform resistivity between its upper and lower interfaces with adjacent layers, the model has the square wave shape. The models used in the preferred embodiment assume that the tool signal will be preprocessed to correct for borehole effect, which is a function of drilling mud conductivity and borehole diameter.

The model includes relatively thick layers such as layer 42. It also includes thin layers, such as 44, which are close to the minimum thickness of a bed which can be resolved by the selected logging tool. The model includes a variety of contrasts, that is the changes in resistivity between adjacent layers. The contrasts vary from below 10 to 1, e.g. at 46, to above 100 to 1, e.g. at 48. This contrast range was chosen as being realistic in terms of what contrasts are most common in actual Earth formations. There are cases where contrasts of 1000 to 1 or higher may be encountered, but these are considered unusual or extreme and are not considered realistic as that term is used in the present invention. When they do occur it is likely that they will extend above or below the limits of the tool operating range, and therefore will not be accurately measured anyway. In the unusual case where such a 1000 to 1 contrast occurs within the tool operating range, the ANN can interpret it as two closely spaced contrasts. None of the interface contrasts extend from the minimum to maximum tool sensitivity values, which for the type of tool and transmitter to receiver spacings used in testing was from about 0.2 ohm-m to about 2000 ohm-m for a total range of about 10,000 to 1. The contrast changes occur across low ranges of resistivity, e.g. at 50, and across high ranges, e.g. at 46.

Several versions of the model in FIG. 5 are used in training the ANN. Two cover the extreme upper and lower ranges of resistivity. In FIG. 5, the resistivity at 42 is the maximum for the whole model. At least one version was selected by positioning this maximum close to the maximum sensitivity of the selected tool, which in this embodiment was about 2000 ohm-m. In similar fashion, a low range version was selected by positioning the lowest resistivity at 52 close to the lowest expected range of about 0.2 ohm-m. One or more versions in intermediate ranges as shown in FIG. 5 are also used. The inventors have found that ANNs do a good job of interpolating between ranges in which they have been trained, but do not do a good job of extrapolating beyond those ranges. By including maximum and minimum levels based on tool operating range and contrasts which realistically occur in nature, the ANN receives all of the training it needs to interpolate any reasonable signal.

The tool operating range is limited by several factors. In very high resistivity formations, the induced current is very small and produces very small signals in the receiving coils. The receiving electronics has some inherent electrical noise which limits the ability of the system to resolve the received signals above some resistivity level. In very low resistivity, the skin effect becomes strong, causing the response to become nonlinear as well as preventing measurement of the actual formation resistivity.

The response of logging tools at interfaces is affected by more than just the value of contrast at that interface. It is also affected by the range at which the contrast occurs. That is, its response to a 10 to 1 contrast between 100 ohm-m and 1000 ohm-m is not the same as it is to a 10 to 1 contrast between 10 ohm-m and 100 ohm-m. Response is affected by relative thicknesses of adjacent layers as well. That is, the response to a given contrast between two thick layers is different from the response to the same contrast between two thin layers or between a thin layer and a thick layer. The Oklahoma type was selected because it provides examples across a range of these possible interface conditions.

Figure 6:
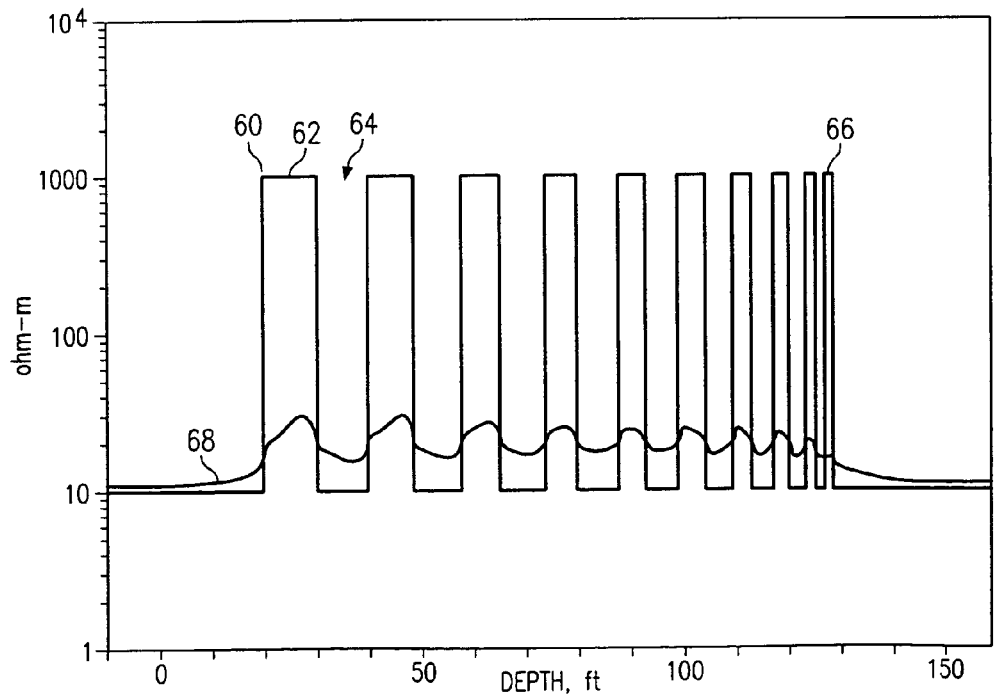
FIG. 6 is a plot of formation resistivity versus depth for a chirp-type earth formation.

FIG. 6 illustrates a chirp formation, which was the other type of model used in training the ANN. This model is again represented by a square wave shape for the same reasons as apply to the Oklahoma type model. The main difference is that for any single version, the resistivity contrast at each interface is the same. The model contains a series of layers, 62, 64, etc., of varying thickness, starting with the thickest at 64 and ending with the thinnest at 66. The rules for selecting parameter values and limits for the chirp model are essentially the same as for the Oklahoma type model. In FIG. 6, each contrast is illustrated as having a contrast of 100 to 1. Other versions of this model having a contrast of 10 to 1 were also used to train the ANN. Two extreme range versions were selected. One had a maximum resistivity value of about 2000 ohm-m. The other had a minimum resistivity value of about 0.2 ohm-m. These values were again selected to cover the limits of the tool operating range while not exceeding realistic values of contrasts found in earth formations.

In FIGS. 5 and 6, there are also illustrated the synthetic logging tool signals 54 and 68, respectively. These are the signals generated in step 32 of FIG. 4. Signals 54 and 68 are the type of signals actually produced by an induction-logging tool used to measure resistivity. The process of inversion is the process of converting these signals into the square wave signals 40 and 60 which more accurately represent the actual resistivity profile of formations through which the borehole is drilled. As discussed with reference to FIG. 4, signals 54 and 68 are the signals fed to the input of ANN 34 during the training process.

FIG. 6 also provides homogeneous formation information for the ANN. A homogeneous formation is thick enough that the tool measures only the one formation at a particular point in the wellbore. That is, the field from the transmitter coil actually or effectively passes through only one formation of essentially uniform resistivity. In FIG. 6, this is simulated in the depth ranges from −10 feet to +10 feet and from 140 feet to 160 feet. The model has a resistivity of 10-ohm meters in these ranges. But the tool signal 68 indicates a resistivity of about 11 ohm meters. The difference is caused by the skin effect. In early testing of the present invention, separate homogenous models at various resistivity levels were used in the training set as a way of teaching the ANN the skin effect at various resistivity levels. This was found not to be essential, probably because the ANN learns enough information concerning homogenous formations from portions of FIG. 6 type models.

Figure 7:
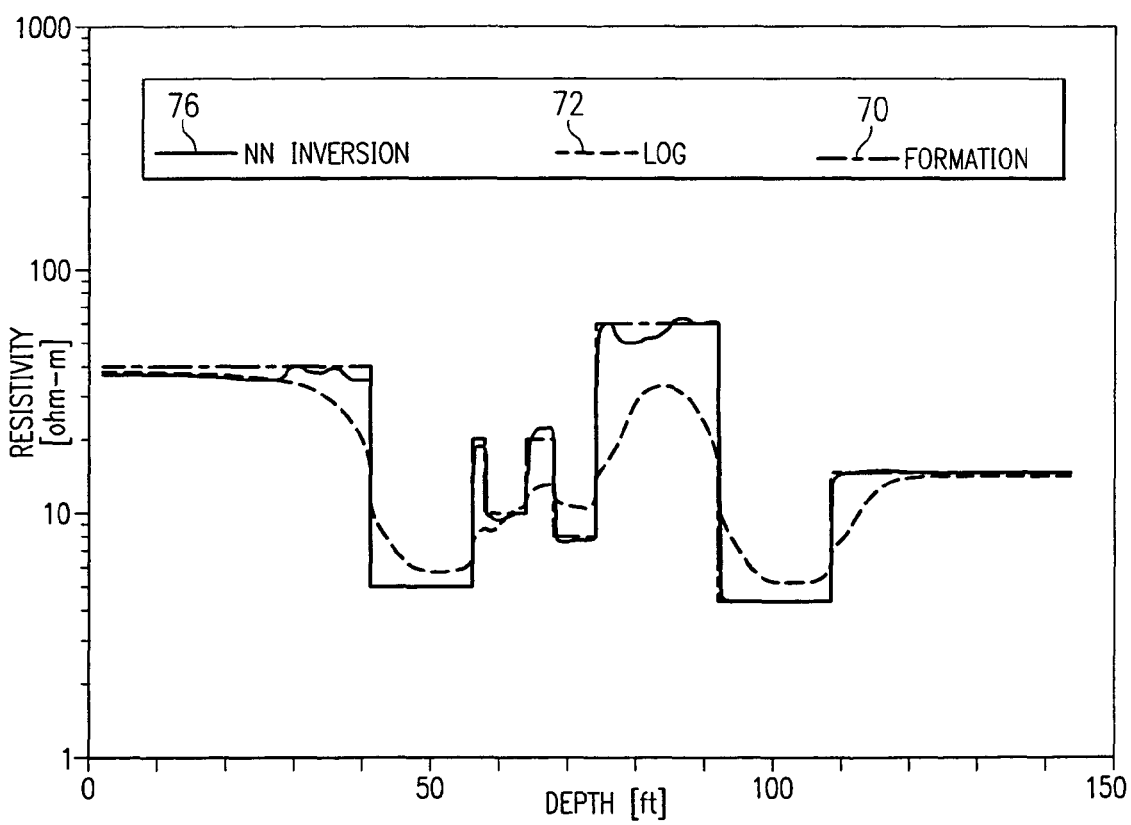
FIG. 7 is a demonstration of performance of a trained neural network in inversion of log data at zero dip.
Figure 8:
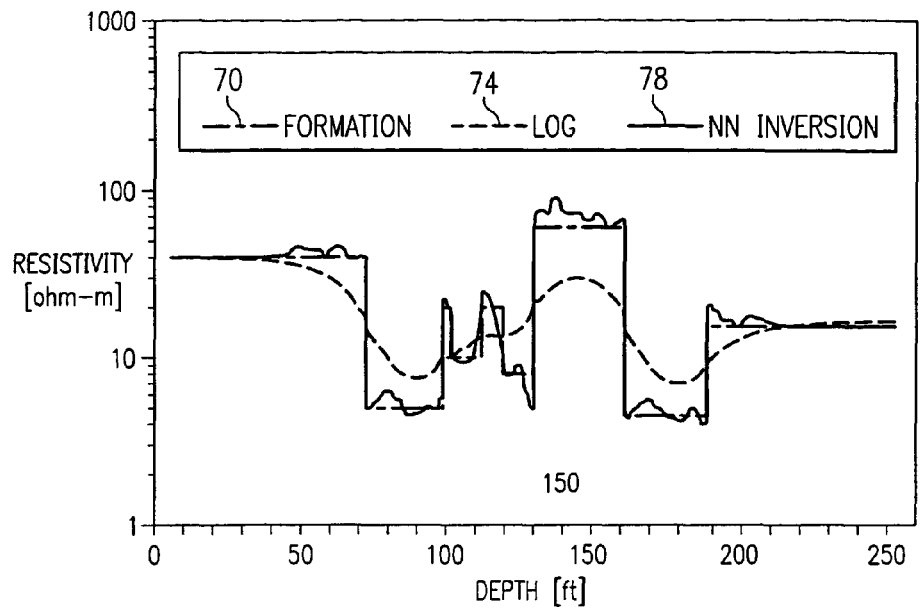
FIG. 8 is a demonstration of performance of a trained neural network in inversion of log data at 55-degree dip.

The ANN was trained as discussed above for various dip angles. It was then tested by inputting other logging signals, both synthetic and actual. As was done during the training process, the logarithms of tool conductivity signals were input to the trained ANN, and the exponential of the ANN output was taken as the formation conductivity representation. Good inversion results were achieved in essentially all cases, including synthetic data representing formations not in the training set as well as data from real logs from different geographical areas. FIGS. 7 and 8 are representative of the results achieved. In both FIGS. 7 and 8, the same synthetic formation profile 70 was used. In FIG. 7, the log signal 72 was for a zero dip case. In FIG. 8, the log data 74 was for a 55° dip. The difference between tool responses is apparent. However, in both cases the ANN inversion, 76 and 78, of the tool signal closely matches the formation model.

Figure 9:
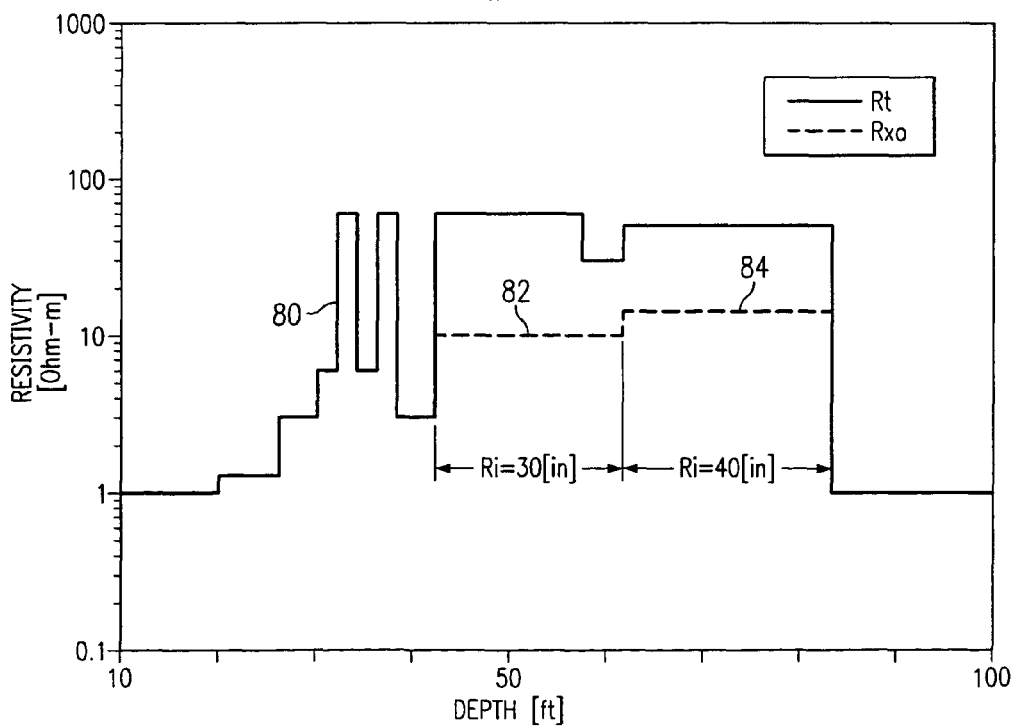
FIG. 9 is an illustration of a 2D test formation.
Figure 10:
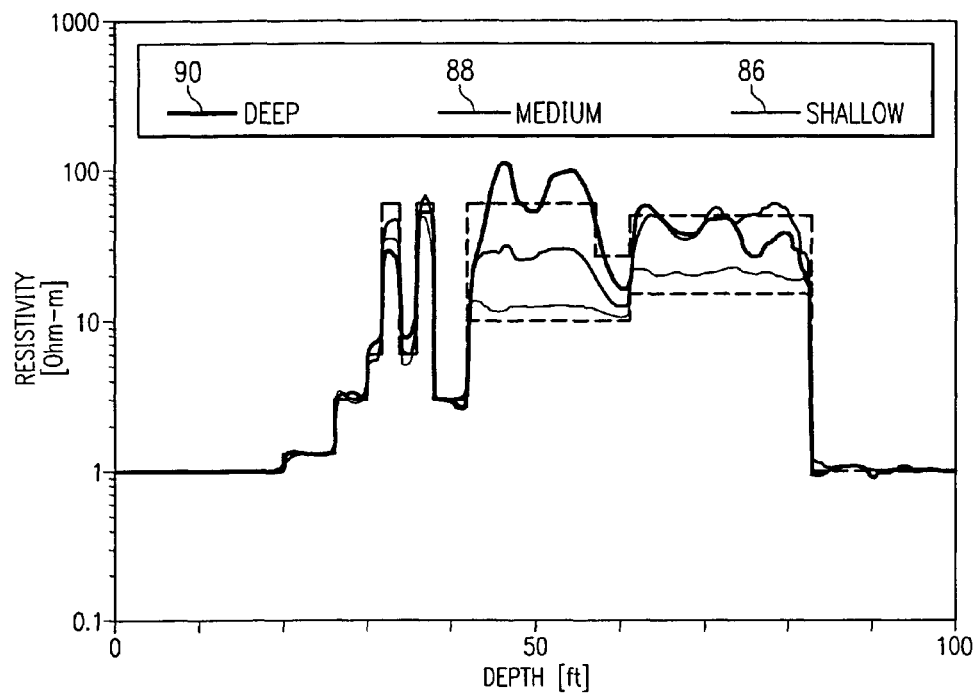
FIG. 10 is an illustration of the performance of a trained neural network in processing of log data from the 2D formation of FIG. 9.

A more complex synthetic test formation is illustrated in FIG. 9. This is a 2D model in which the true resistivity is shown by the solid line plot 80. In a 2D case, portions of the formation near the borehole have been invaded by drilling fluid which changes the resistivity in the invaded zone. In the dotted line plot 82, a portion of the formation has been invaded by drilling mud to a depth of thirty inches from the borehole lowering the resistivity from sixty ohm-m to ten ohm-m. In the dotted line plot 84, a portion of the formation has been invaded by drilling mud to a depth of forty inches from the borehole lowering the resistivity from 50 ohm-m to about fifteen ohm-m. This model was used to produce synthetic logs for shallow, medium and deep transmitter receiver spacings. The synthetic logs were then processed by ANNs trained as set out above, one ANN for each receiver. The results of this test are shown in FIG. 10. The shallow, medium and deep results are shown by the curves 86, 88 and 90. The shallow curve 86 is close to the resistivity of the invaded zones, because most of the signal measured by the shallow receiver originates in the region near the borehole. The deep curve 90 is close to the resistivity of the uninvaded formation, because much of its signal measures deep into the formation. The medium depth curve 88 is between, as expected. Known methods of further processing the curves 86, 88 and 90 can provide a good estimate of the depth of the invaded zone. This test illustrates that a trained ANN as specified herein is suitable for processing logging tool signals from 2D formations, even though no 2D data was used in the training model data set. However, if desired, the ANN can be trained using 2D models. Forward solvers for logging tools can produce the synthetic response for the 2D models which are needed for the training process. Otherwise the training process is the same as for 1D models. In some cases, ANNs trained with 2D or 3D models may give better results.

The ANN outputs, such as those shown in FIGS. 7, 8 and 10, are not perfect representations of the desired formations. In an effort to reduce the errors, several ANNs were trained with the same training set to produce several different sets of coefficients. This can be done by training ANNs having the same structure with the identical data sets, but with different initial conditions for the network coefficients. Alternatively, the structure of the ANN can be modified slightly before training. In either case, the final coefficients are different and the inherent errors are different. The multiple trained ANNs were then used to process the same test data and the results were combined. The inherent errors in the outputs were different and therefore canceled to some extent. The combined outputs provided a more accurate representation of the actual formation parameters. This multiple ANN process also illustrates that there is no one best ANN structure or set of initial conditions. Many combinations of structure and initial conditions will result in coefficients which provide acceptable inversion processing.

While particular synthetic formation models were used in the embodiment disclosed herein, it is apparent that other models could be used with similar success if the basic selection rules are followed. The training set should include synthetic models which have upper and lower parameter values which span the upper and lower operating range limits of the selected logging tool. Several versions of each model should be included with at least one having an upper parameter value at about the upper operating range limit of the tool and at least one having a lower parameter value at about the lower operating range limit of the logging tool. Parameter contrasts at bedding layer interfaces should vary over a range which is realistic in terms of what normally occurs in real earth formations, which for the preferred embodiment was from about 10 to 1 to about 100 to 1. The models should include bedding layer thicknesses ranging from a maximum roughly corresponding to the area measured by the tool to the minimum thickness which the selected tool can resolve. These conditions can be met with a relatively small set of synthetic models, so that training time is reasonable. By using only synthetic models, all of the "rules" which the ANN "learns" during the training process are accurate, that is not contaminated by measurement or other errors. As a result, the ANNs trained with these types of training sets are able to perform direct inversion of logging signals into the desired logs of formation parameters for data from essentially any area.

In developing the present invention, ANNs were initially trained with both the in-phase and quadrature signals from the logging tool and good results were achieved. However using both signals slowed the development project because it doubles the inputs to the ANN during the training process and therefore increases the time and expense involved. Generally, the quadrature signal for real logging tool signals is more noisy than the in-phase signal. It was decided to use only the in-phase component to simplify the development and testing process and to avoid the more noisy part of the real data. The results indicate that this was a good choice for induction tools like the HRAI. There may be some unusual or extreme formations for which it may be necessary to use both components, and it will therefore be necessary to train an ANN with both. In LWD or MWD processes, it is customary to use both in-phase and quadrature signals to evaluate phase and attenuation and the ANN should be trained for both signals to do this.

As noted above, separate ANNs can be trained for each transmitter receiver set in a logging tool. In the HRAI tool there are six different spacings and ten different receiver arrays. In the preferred embodiment, ANNs were generated for several different spacings as illustrated in FIG. 10. It is also possible, and often desirable, to use the signals from two or more of the spacings to produce one log. This is often done to improve the quality of the inversion. By combining signals from two or more receivers, the uncorrelated part of the noise tends to cancel while the desired signals reinforce. An ANN can be trained for this purpose. That is, the outputs of forward solvers for two, or more, transmitter receiver spacings can be used to train one ANN, which then can be used to process corresponding real signals to generate one log of the desired parameter.

The present invention was developed and demonstrated using HRAI induction logging tool conductivity data. The invention is equally applicable to other data produced by induction logging tools, such as dip, strike and anisotropy measurements. It is also applicable to data from other types of logging tools, such as electric, acoustic, magnetic, gravity, and nuclear (e.g. neutron or gamma ray) tools. It is applicable to tools carried on drill strings as well as those suspended by wirelines.

The Constrained Committee Network Embodiment

The common practice for ANN inversion of array induction logs is to use a sequence of apparent resistivity measurements as input, to recover the true formation resistivity at the center point of the input window. We have demonstrated that this multiple-input/single-output architecture works well for several short transmitter-receiver spacing subarrays. For deep spacing subarrays, however, the variance in prediction with a single ANN is relatively high. This is due to the fact that the deep array measurements have less high-frequency content, larger shoulder bed effect and increased nonlinearity. Typically the regions surrounding bed boundaries in the formation become harder to recover accurately. To improve the accuracy of the ANN inversion models for deep spacing subarrays, we disclose a new neural network architecture, called the constrained network committee, along with a "quick-look" method to significantly reduce the computational load of training the proposed network committee.

Figure 11:
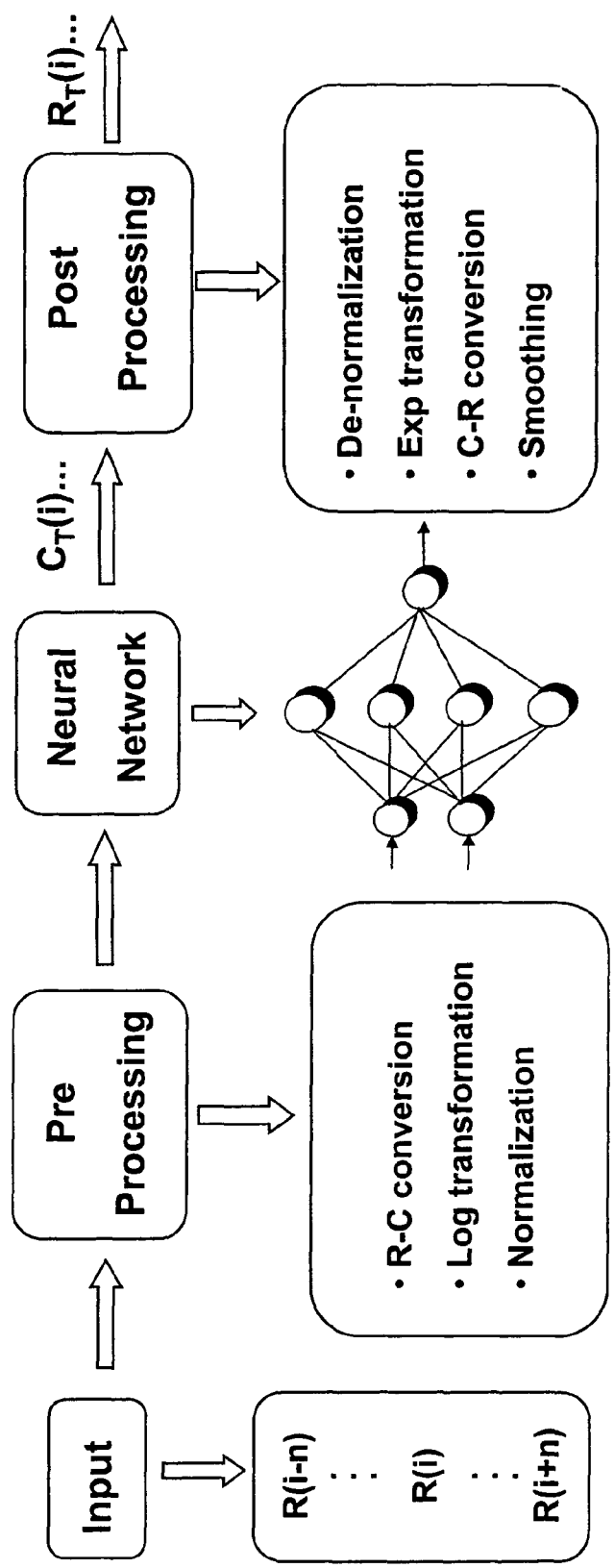
FIG. 11 is a typical flow chart of neural network inversion of induction logs.

FIG. 11 shows a typical flow chart of the use of ANN inversion algorithm in the processing of the logging data. In this flow chart, a multiple-input/single-output network is used for searching the transformed correlation between the windowed apparent sensitivities and the referential true formation resistivity, where the input window contains the same measurement points above and below the reference center in the true vertical depth with the error in the training being evaluated at one single position, the position of the output resistivity that corresponds to the position of the center of the input window. Being a harder problem, due to the lower frequency content and increased nonlinearity, the inversion of the deeper sub-array measurements is less accurate. The uncertainty in modeling input/output relationship with the use of the fixed window structure is one of the main reasons which cause variance in logging data interpretation. To solve this complex problem, the current technology allows us to combine a number of networks together to form a committee. The committee members could be selected from many distinct networks with various structure/initial weights and trained with different data sets. The committee output can be taken as the output of average of the several single networks which comprise the committee. The problem with this approach in well logging data interpretation is the processing time. The total number of parameters in such a committee is the sum of the parameters of each individual network, and dealing with networks with different architectures requires more matrix manipulations which takes longer time in series processing, and needs more processors in parallel processing. Also, training and keeping track of a number of different networks will increase the computational and managerial load.

In this embodiment, we present a new method to overcome the limitations discussed above, and show how it improves the logging data interpretation. This embodiment provides: a new apparent resistivity/true resistivity mapping relationship; a constrained network committee to establish the presumed relationship and reduce the output uncertainty; and, a "quick-look" training method to efficiently training the presented network committee.

The method proposed in this embodiment can be applied to improve the processing of any log measurement with similar problems to the ones associated with the deep subarrays of the HRAI tool. The proposed method should improve the processing of log data in every situation, although being relatively more time consuming that the standard single output procedure, we recommend the new method for the relatively harder problems, in which the use of the standard method leads to low quality results. More generally, this embodiment is applicable to uncertain non-causal system for which the output $y(n_0)$ depends on the input samples $x(n)$, for n extended in both directions of $n_0$. Many geophysical applications are among this category.

Figure 12:
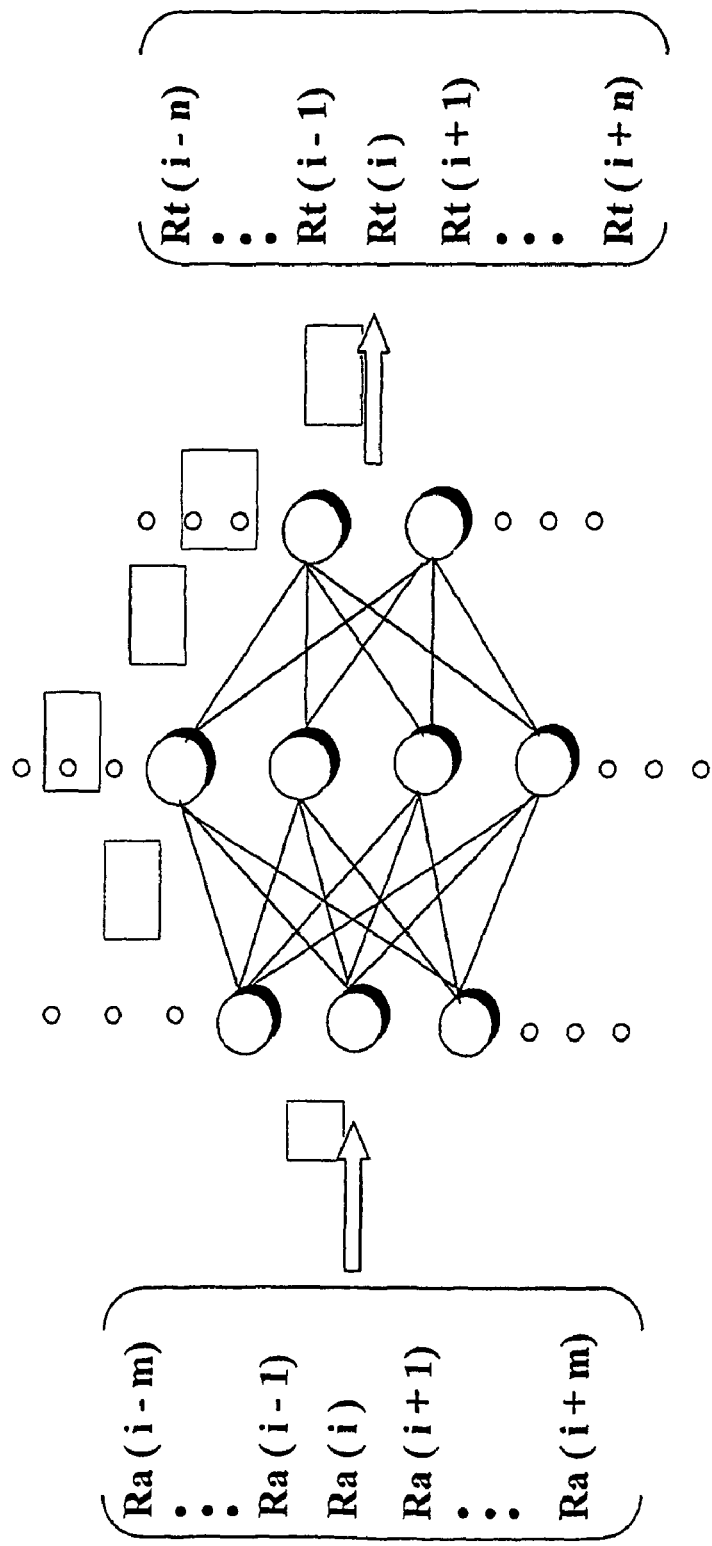
FIG. 12 is an illustration of a multilayer feedforward network with multiple outputs forming a constrained network committee.

In this embodiment, we established a new input/output mapping relationship for deep-spacing arrays in processing logging data. For the given network inputs, the network output, which is the recovered formation resistivity, is not necessarily mapped to the referential center only. It could be mapped to any point in the central vicinity. By predicting the resisitivity at several positions, which form an output window, and evaluating the error in the training over the length of this output window, not only the error in the output value, but also the error in the output slope are penalized, leading to less variation in the prediction. In addition, the new procedure generates as many predictions at each position as the number of points in the output window. After averaging these outputs, the variance is further reduced. This relationship can be implemented with a multilayer feedforward network with multiple outputs, which is shown in FIG. 12. Note that, each output has shared network connections (weights) in the hidden layer. The shared connections put the constraints to the output ensemble. This network architecture allows each output node to produce its interpretation sequence based on the slightly different mapping assumption. FIG. 13 shows such sequences in a five-output example, with each sequence being a shifted prediction of the other. The models which simultaneously extract the formation resistivities in the central vicinity constitute a constrained network committee (CNC), and the outputs referring to the same TVD (true vertical depth) index may display an observed variation, indicating the uncertainty in logging data interpretation. To reduce the interpretation uncertainty, the CNC output can be computed by averaging its member outputs over the diagonal along which the outputs have the same TVD index (see FIG. 13).

The problem associated with CNC is the computational load in training the multi-input/multi-output neural network. Using a 11-member network committee for example, the total number of parameters can be up to 4000, and the error terms involved in the optimization algorithm may exceed 500,000 with a moderate training set. A single training trial for this problem using traditional method will cost more than one week with current computer capability. In this embodiment, a "quick-look" method was developed to reduce the computational load. This method initializes the network parameters in different ways when a new subarray model is ready to train. The main options of this "quick-look" method are:

To initialize a new subarray model with the network weights of the trained adjacent subarray.

To initialize a new subarray model of certain frequency with the resulting weights of the same subarray of different frequency.

To initialize a new subarray model by combining its previous network weights with newly added near-zero weights when increasing the number of input neurons, or hidden neurons, or output neurons is needed.

The idea of using "quick-look" approach is based on the fact that some sort of similarity in tool response exists among the adjacent subarrays, or same subarray but different excitation frequencies. Therefore, the training initialized by option 1 and 2 somehow acts as a rescaling of the input/output mapping, which usually creates a steeper gradient in error reduction during the iterative learning. The approach described in option 3 can make the training starting accuracy of the new model as close as to the previous model, which will significantly improve the training efficiency.

The new approach has the following advantages:

The CNC provides a promising method to reduce the uncertainty caused by tool limitation, and environmental effects in logging data interpretation. The reduction in error can be viewed as arising from the reduced variance due to the averaging over many solutions.

The CNC can be manipulated using a single multilayer feedforward neural network, which is cost effective with competitive processing speed.

Since the CNC generates the shared weights and averaged output, it usually produces smooth prediction. No other regularization techniques are needed in this approach which allows the committee network to be trained using the fast training algorithm with less worry about the overfitting.

The "quick-look" method can reduce the computational load with the traditional initialization method up to 60 percent.

Figure 14:
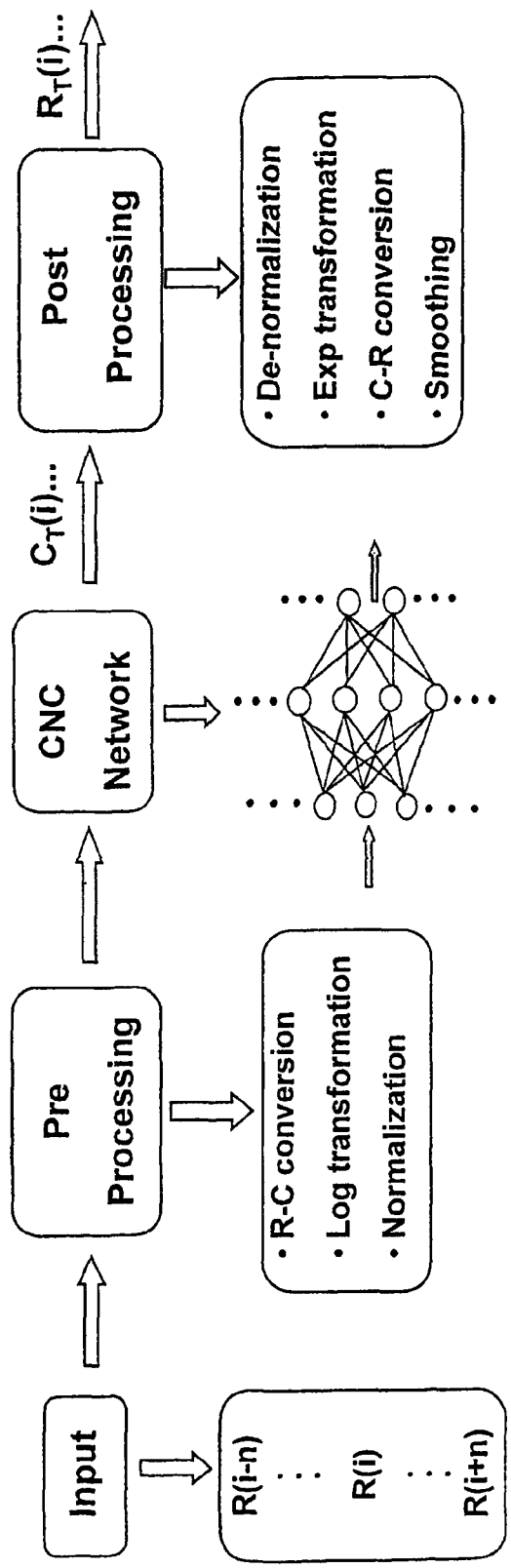
FIG. 14 is a flow chart illustrating processing of array induction logs with a constrained network committee.

Processing array induction logs with constrained network committee is illustrated in FIG. 14. In this flow chart, the logging data (usually apparent resistivity) from a certain subarray is formatted to fill the input window. Then a pre-processing transformation to the input data is applied before it is presented to the CNC network. The CNC network works as a nonlinear filter, and it is trained with simulation data which is described in our previous publication. The CNC output feeds through a post-processing procedure before providing to the customer.

For the CNC network, the input window usually covers information about 25-ft to 50-ft measurements with respect to the TVD. A 11-node output (corresponding to 11 committee members) is preferred with 0.25-ft interval in between, which constitutes a 2.5-ft output window. For the high dipping bed application, the output window with similar length in true vertical distance is preferred. This window size provides optimal trade-off between prediction bias and variance, and allows reasonable computational load during the training. The CNC output can be either mean or weighted sum over the member outputs having the same TVD index.

In this section, we first illustrate the testing results in processing simulated logs, for which the true formation resistivities are known, with CNC network and single-output network respectively. Then we will demonstrate that the disclosed "quick-look" method really significantly reduces the computational load in training the CNC network.

Figure 15:
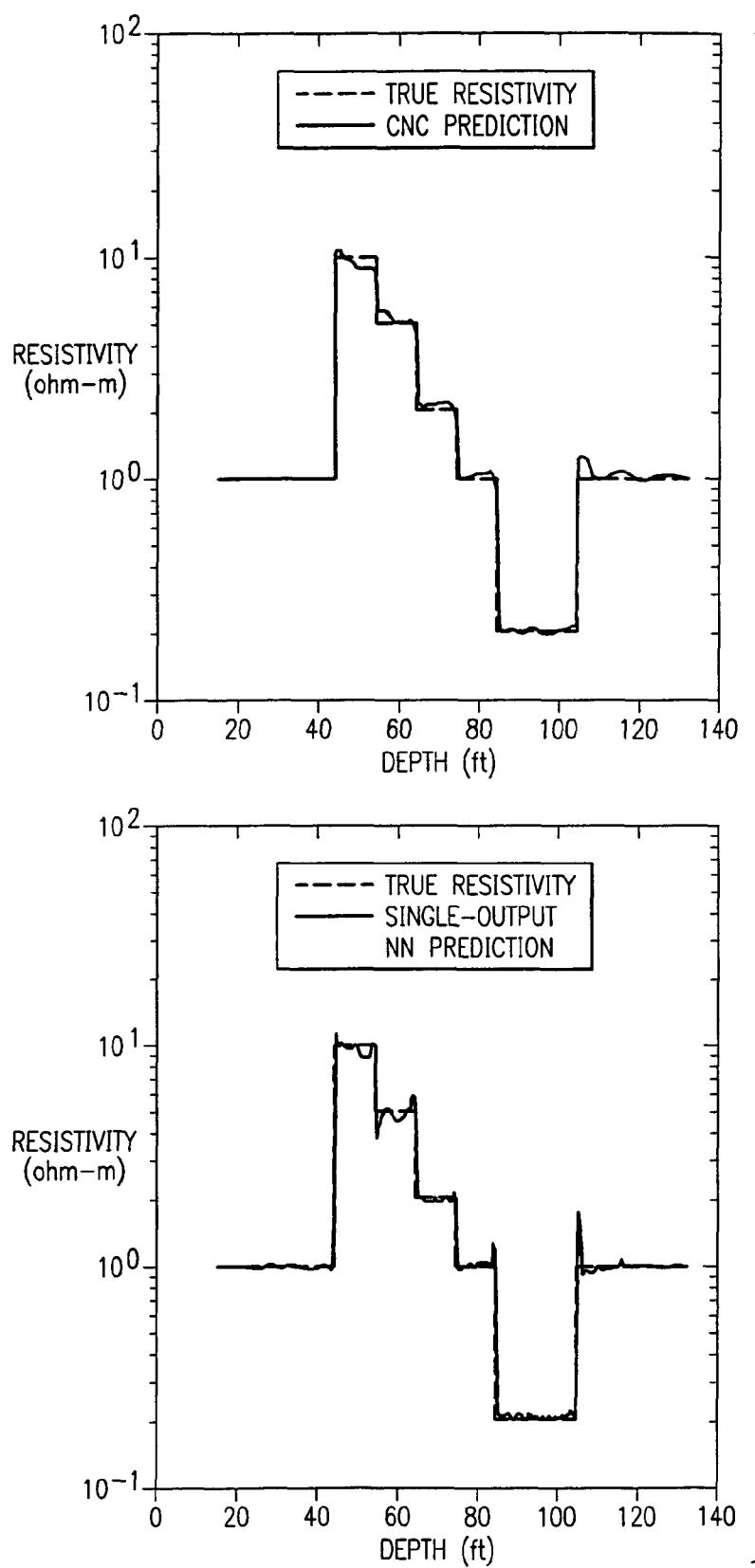
FIG. 15 are inversion outputs providing a comparison of performance of a constrained network committee and a single output network.

FIG. 15 presents a performance comparison of the CNC network and the standard single-output network for subarray-1, using the 8 KHz frequency training data simulated from the zero dipping geometry. The formation profile utilized here is a testing file which is excluded from the training patterns. It is not difficult to identify through the visual inspection that the CNC network produces the prediction which generates better than the single-output network.

Figure 16:
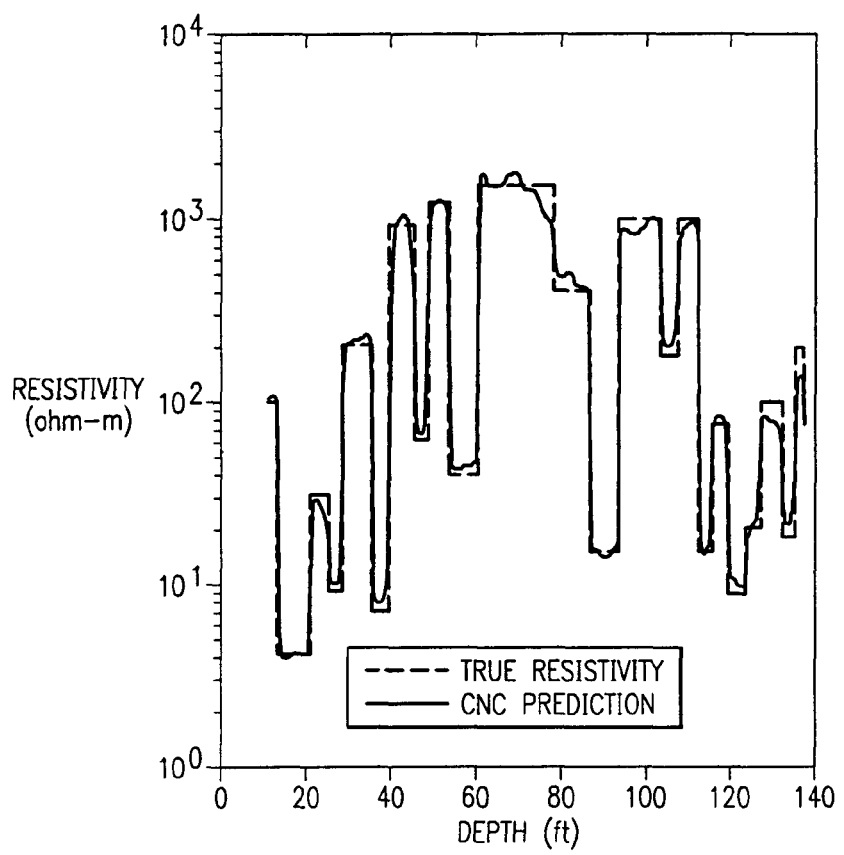
FIG. 16 are inversion outputs for a dipping bed application providing a comparison of performance of a constrained network committee and a single output network.
Figure 16:
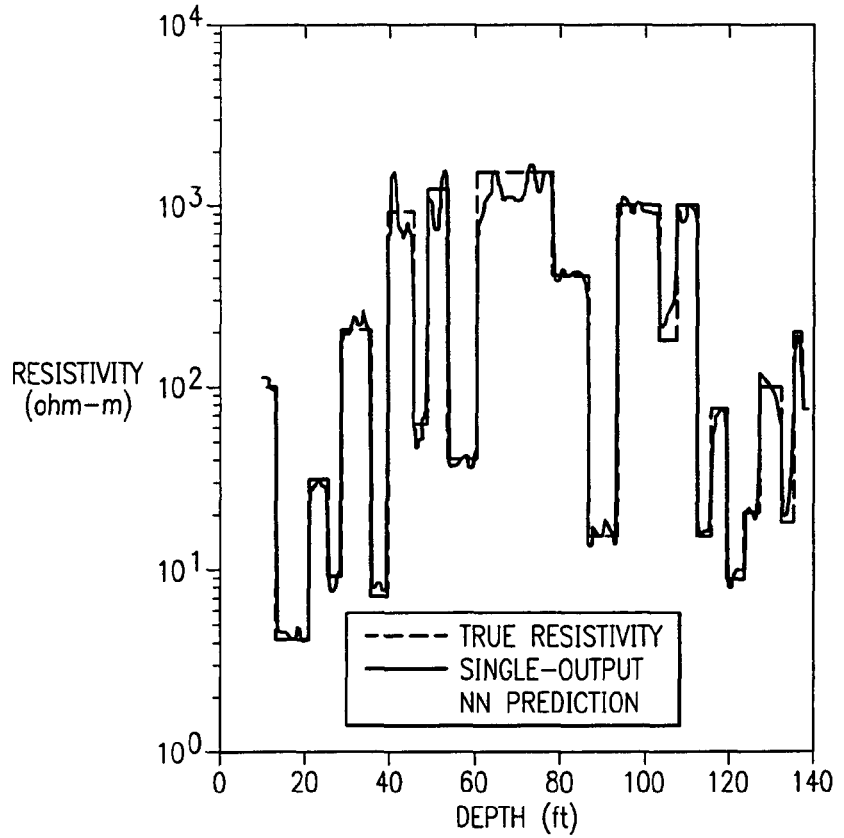

The other example is given in FIG. 16 for dipping bed application, tested with subarray-1 models and 8 KHz data. The testing file has the Oklahoma-formation-like shape, which is the standard benchmark problem for performance evaluation. The same conclusion can be drawn from this test that the measurement interpretation using CNC network is less excursive within the beds and more consistent with true formation resistivity.

Figure 17:
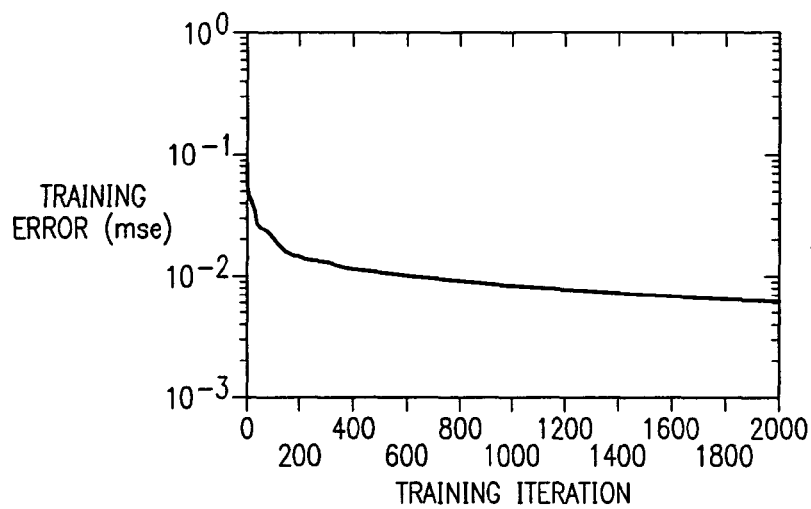
FIG. 17 is a plot of training trajectory for standard initialization for a constrained network committee.

FIG. 17 illustrates a trajectory of the training error versus the number of iterations for a CNC network, using the training examples of the subarray-2, 8 KHz excitation frequency and zero dipping angle. The chosen 101-20-40-11 network is initialized with standard method and trained with scaled conjugate gradient (SCG) algorithm. It takes about 2000 iterations to reduce the mean-of-squared (mse) error to 0.006, and still needs more iterations to get the adequate training accuracy.

Figure 18:
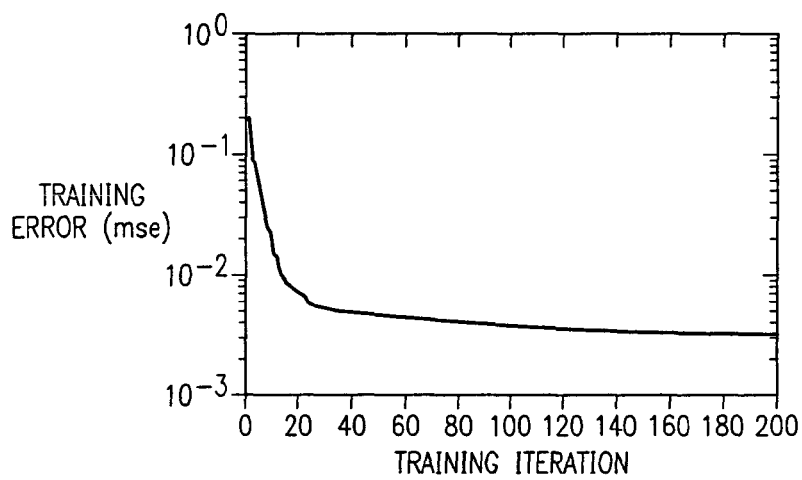
FIG. 18 is a plot of training trajectory for standard initialization for a constrained network committee with the quick-look method; and, FIG. 19 is a plot of training trajectory for standard initialization for a constrained network committee with a different option of the quick-look method.

In comparison, FIG. 18 shows the error reduction rate of the "quick-look" method. The CNC network with same architecture is trained with same algorithm using the same examples. The difference here is the way to initialize the network parameters. The initial weights used in this training trial is the resulting weights of the CNC network for the same subarray, but different excitation frequency (32 KHz). We can see that although the starting training error in FIG. 18 is close to FIG. 17, it takes only 200 iterations in FIG. 18 to achieve the much better training accuracy as illustrated in FIG. 17.

Figure 19:
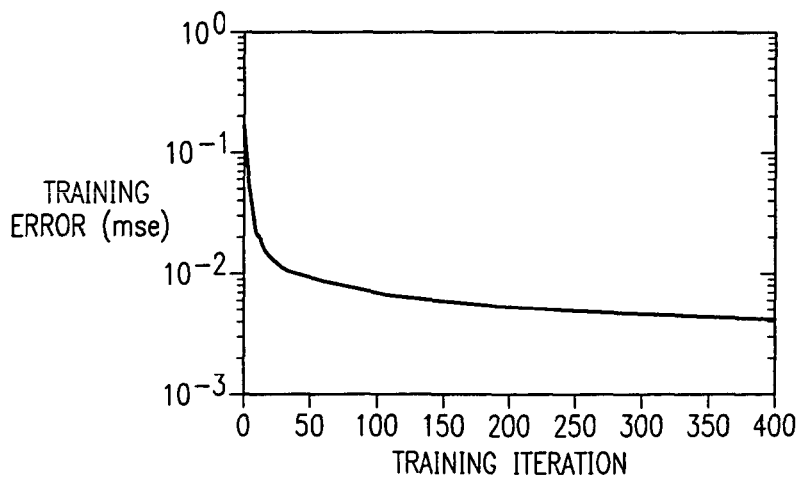

FIG. 19 presents another example using a different option of the "quick-look" method. The CNC network is trained for subarray-1 under 32 KHz excitation frequency and zero dipping angle, but initialized with resulting weights of the subarray-2 CNC network. The training takes 400 iterations to reach the displayed accuracy, which usually needs more than five thousands of iterations to train by using the standard initialization method.

It is apparent that various changes can be made in the apparatus and methods disclosed herein, without departing from the scope of the invention as defined by the appended claims.

What is claimed is:

1. Apparatus for converting output signals of a logging tool into a log representing a parameter of earth formations surrounding a borehole, comprising:
an artificial neural network trained with a set of synthetic earth formation models selected to cover the operating range of a selected logging tool based on sensitivity and resolution limits of the logging tool and based on realistic ranges of formation parameters;
means for combining the outputs of said neural network to generate an average value for each depth point in the borehole;
said logging tool output signals are a series of samples each representing the signal at a depth point in said borehole, and
said neural network has a plurality of inputs receiving the samples from a range of depths in the borehole and a plurality of outputs representing the value of the parameter at a plurality of depth points within the range of depths.

2. Apparatus for converting output signals of a logging tool into a log representing a parameter of earth formations surrounding a borehole, comprising:
an artificial neural network trained with a set of synthetic earth formation models comprising:
a. a plurality of chirp models having continuously increasing layer thicknesses, each chirp model having parameter contrasts at layer interfaces limited to realistic contrasts found in actual earth formations, at least one model having an upper parameter limit substantially at the upper limit of the selected tool operating range, and at least one model having a lower parameter limit substantially at the lower limit of the selected tool operating range, and
b. a plurality of Oklahoma type models having parameter contrasts at layer interfaces limited to realistic contrasts found in actual earth formations, at least one model having an upper parameter limit substantially at the upper limit of the selected tool operating range and at least one model having a lower parameter limit substantially at the lower limit of the selected tool operating range.

3. The apparatus of claim 2, wherein:
the logging tool is an induction logging tool having a ratio of maximum sensitivity to minimum sensitivity of about 10,000 to 1 and the chirp models include at least one model with parameter contrasts at layer interfaces of about 10 to 1 and at least one model with parameter contrasts at layer interfaces of about 100 to 1.

4. The apparatus of claim 2 wherein:
the logging tool is an induction logging tool having a ratio of maximum sensitivity to minimum sensitivity of about 10,000 to 1 and the Oklahoma models have parameter contrasts at layer interfaces from about 10 to 1 to about 100 to 1.

5. A method for converting output signals of a logging tool into a log representing a parameter of earth formations surrounding a borehole, comprising:
creating a set of synthetic earth formation models comprising:
a. a plurality of chirp models having continuously increasing layer thicknesses, each chirp model having parameter contrasts at layer interfaces limited to realistic contrasts found in actual earth formations, at least one model having an upper parameter limit substantially at the upper limit of the selected tool operating range, and at least one model having a lower parameter limit substantially at the lower limit of the selected tool operating range, and
b. a plurality of Oklahoma type models having parameter contrasts at layer interfaces limited to realistic contrasts found in actual earth formations, at least one model having an upper parameter limit substantially at the upper limit of the selected tool operating range, and at least one model having an lower parameter limit substantially at the lower limit of the selected tool operating range;

generating synthetic responses of the selected tool to each of the artificial formation models;

using the synthetic responses and the formation models to train an artificial neural network to generate representations of the formation models in response to the synthetic responses; and processing actual logging signals from the selected tool with the trained neural network to produce a log of the earth parameter.

6. The method of claim 5, wherein:

the logging tool is an induction logging tool having a ratio of maximum sensitivity to minimum sensitivity of about 10,000 to 1 and the chirp models include at least one model with parameter contrasts at layer interfaces of about 10 to 1 and at least one model with parameter contrasts at layer interfaces of about 100 to 1.

7. The method of claim 5 wherein:

the logging tool is an induction logging tool having a ratio of maximum sensitivity to minimum sensitivity of about 10,000 to 1 and the Oklahoma models have parameter contrasts at layer interfaces from about 10 to 1 to about 100 to 1.

8. The method of claim 5, further comprising;

using the synthetic responses and the formation models to train one or more additional artificial neural network or networks to generate representations of the formation models in response to the synthetic responses;

processing the actual logging signals from the selected tool with the additional trained neural network or networks to produce an additional log or logs of the earth parameter; and, combining the logs of the earth parameter to produce a composite log of the earth parameter.

9. The method of claim 5, wherein:

the selected logging tool is an induction logging tool having more than one transmitter receiver pair and the synthetic responses from the selected tool include responses from more than one transmitter receiver pair.

10. The method of claim 5, wherein:

the selected logging tool is an induction logging tool having both in phase and quadrature output signals and the synthetic responses from the selected tool include both signals.

11. The method of claim 5, wherein the artificial neural network has a plurality of outputs, each producing an output signal representing a different depth point in the borehole, further comprising:

combining the outputs of the neural network according to depth points to produce a composite log of a formation parameter.

12. Apparatus for converting output signals of an induction logging tool into a log representing a parameter of earth formations surrounding a borehole, comprising:

an artificial neural network trained with a set of synthetic earth formation models comprising:

a. a plurality of chirp models having continuously increasing layer thicknesses, and having parameter contrasts of from about 10 to 1 to about 100 to 1 at layer interfaces, each model having different upper and lower parameter limits, selected so that the highest and lowest parameter limits are substantially at the upper and lower limits of the selected tool operating range, and b. a plurality of Oklahoma type models having parameter contrasts of from about 10 to 1 to about 100 to 1 at layer interfaces, each model having different upper and lower parameter limits, selected so that the highest and lowest parameter limits are substantially at the upper and lower limits of the selected tool operating range.

13. A method for converting output signals of an induction logging tool into a log representing a parameter of earth formations surrounding a borehole, comprising:

creating a set of synthetic earth formation models comprising:

a. a plurality of chirp models having continuously increasing layer thicknesses, and having parameter contrasts of from about 10 to 1 to about 100 to 1 at layer interfaces, each model having different upper and lower parameter limits, selected so that the highest and lowest parameter limits are substantially at the upper and lower limits of the selected tool operating range, and b. a plurality of Oklahoma type models having parameter contrasts of from about 10 to 1 to about 100 to 1 at layer interfaces, each model having different upper and lower parameter limits, selected so that the highest and lowest parameter limits are substantially at the upper and lower limits of the selected tool operating range;

generating synthetic responses of the selected tool to each of the artificial formation models;

using the synthetic responses and the formation models to train an artificial neural network to generate representations of the formation models in response to the synthetic responses; and processing actual logging signals from the selected tool with the trained neural network to produce a log of the earth parameter.

14. The method of claim 13, further comprising;

using the synthetic responses and the formation models to train one or more additional artificial neural network or networks to generate representations of the formation models in response to the synthetic responses;

processing the actual logging signals from the selected tool with the additional trained neural network or networks to produce an additional log or logs of the earth parameter; and, combining the logs of the earth parameter to produce a composite log of the earth parameter.

15. The method of claim 13, wherein the selected logging tool has more than one transmitter receiver pair and the synthetic responses from the selected tool include responses from more than one transmitter receiver pair.

16. The method of claim 13, wherein the selected logging tool provides both in phase and quadrature output signals and the synthetic responses from the selected tool include both signals.

17. The method of claim 13, wherein the artificial neural network has a plurality of outputs, each producing an output signal representing a different depth point in the borehole, further comprising;

combining the outputs of the neural network according to depth points to produce a composite log of a formation parameter.

* * * * *